Jan. 16, 1951        H. S. GOSS        2,538,362
COOLING APPARATUS FOR VEGETABLES AND FRUITS
Filed July 13, 1946        2 Sheets-Sheet 1
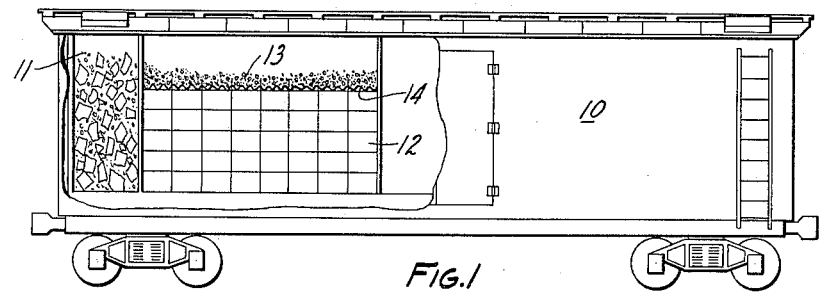
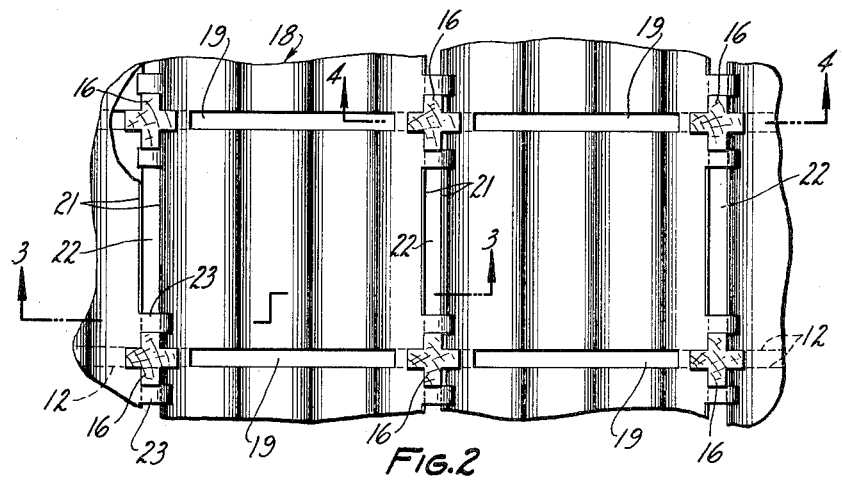
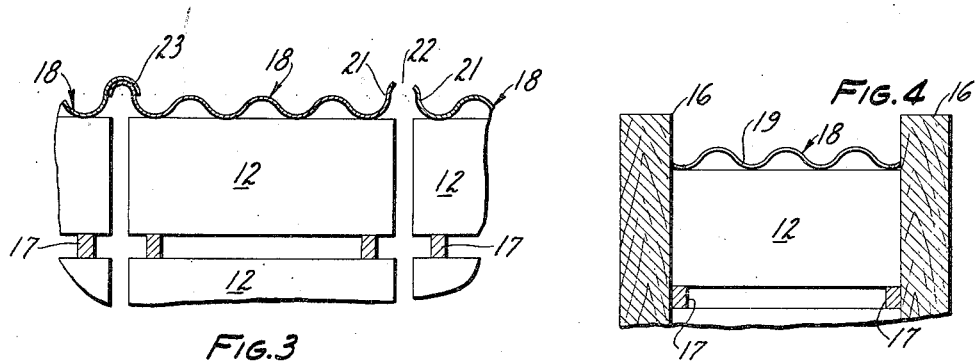
INVENTOR.
Hubert S. Goss
BY *Harper Allen*
ATTORNEY Jan. 16, 1951  H. S. GOSS  2,538,362
COOLING APPARATUS FOR VEGETABLES AND FRUITS
Filed July 13, 1946  2 Sheets-Sheet 2
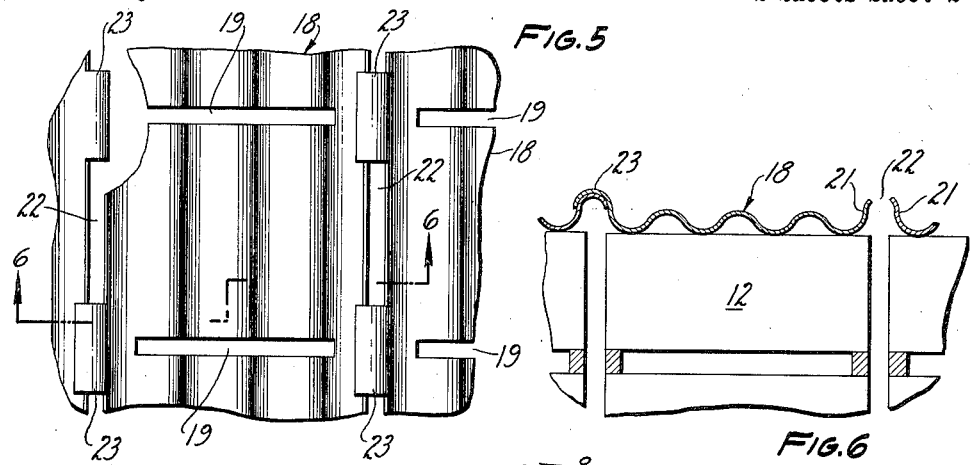
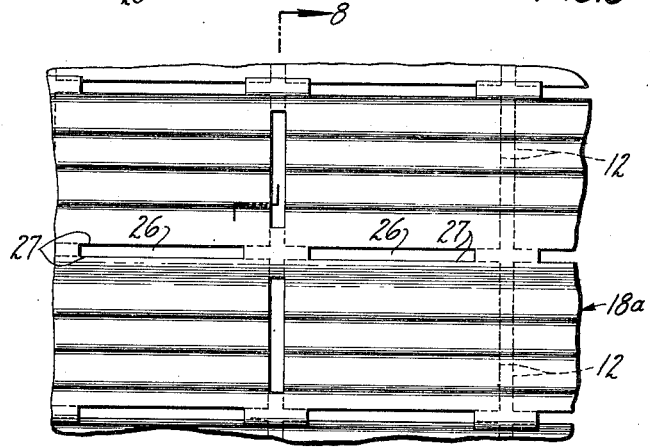
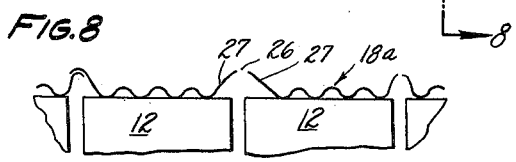
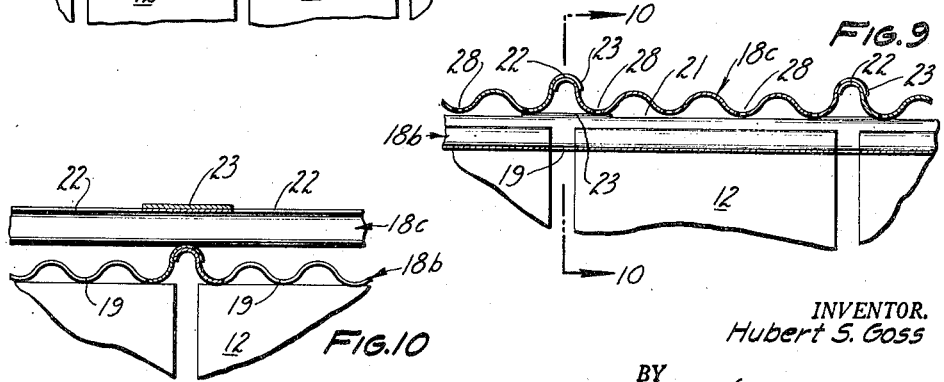
INVENTOR.
Hubert S. Goss
BY
ATTORNEY Patented Jan. 16, 1951

2,538,362

UNITED STATES PATENT OFFICE 2,538,362

COOLING APPARATUS FOR VEGETABLES AND FRUITS

Hubert S. Goss, Fresno, Calif.

Application July 13, 1946, Serial No. 683,507

8 Claims. (Cl. 62—1)

This invention relates to the art of cooling fruit and vegetable produce by means of a layer of refrigerant such as crushed ice and referred to in the trade as "top ice," and is concerned more particularly with the provision of an improved partition or cover for placing over stacks of boxes of produce to support the layer of top ice.

It is a general object of the invention to provide an improved method and apparatus for cooling produce by means of a layer of refrigerant or ice thereon.

Another object of the invention is to provide an ice supporting cover for boxed produce.

A further object of the invention is to provide an ice supporting cover for material such as boxed produce which provides for proper circulation of cooled air around the produce and for drainage of melted ice without contacting the produce.

The above and other objects are attained in certain preferred embodiments of the invention as disclosed in the accompanying drawings, in which:

Figure 1 is a side elevational view of a refrigerator car partially broken away to illustrate the general arrangement of the present invention.

Figure 2 is a fragmentary plan view of an arrangement embodying the instant invention as employed in connection with a crosswise or "Hoak" load in a refrigerator car, that is, a load in which the length of the boxes extend crosswise of the car.

Figure 3 is a sectional view taken as indicated by the line 3—3 in Figure 2.

Figure 4 is a sectional view taken as indicated by the line 4—4 in Figure 2.

Figure 5 is a fragmentary plan view showing the invention as employed in connection with a lengthwise load within a refrigerator car, that is, a load in which the length of the boxes in the load extend lengthwise of the car.

Figure 6 is a sectional view taken as indicated by the line 6—6 in Figure 5.

Figure 7 is a fragmentary plan view showing a form of the invention in which a single cover member or sheet is related to a plurality of tiers of stacked boxes.

Figure 8 is a schematic sectional view taken as indicated by the line 8—8 in Figure 7.

Figure 9 is a sectional view similar to Figure 6 but showing a double layer cover structure.

Figure 10 is a sectional view of the form of the invention shown in Figure 9, being taken as indicated by the line 10—10 therein.

In the shipping of fresh fruit and vegetable produce by refrigerator car it is common practice to effect a pre-refrigeration or pre-cooling of the produce so that at the start of the journey the ice in the ice bunkers merely has to retain the produce at the desired temperature rather than to effect further cooling. In this way fewer stops for re-icing of a produce train are required.

In carrying out such pre-cooling it has been found disadvantageous to delay the starting of the train until the pre-cooling of all of the cars has been effected, so that the practice of "top icing" has been followed recently with respect to vegetable or fruit produce which moisture does not harm by simply loading the car and then placing a layer of from eight to ten inches of crushed ice on top of the load in the refrigerator car. However, the practice of top icing has never extended to the cooling of fruits and vegetables where moisture is undesirable. In accordance with the instant invention the practice of top icing is extended to all types of fruits and vegetables so that the initial cooling of the produce to the desired temperature can be effected in the efficient top icing method without injury to the produce because of moisture.

In the loading of the crates or boxes of fruits or vegetables in a refrigerator car it is customary to provide spaces between adjacent stacks of boxes with the endwise position extending transversely of the car, lengthwise of the car, or vertically of the car, and the instant invention is equally applicable to these various types of loading arrangements.

In accordance with the instant invention, a cover structure is provided over the stacks of boxes within the car for supporting the layer of top ice and for controlling the flow of cooled air between the stacks of boxes and the draining of melted ice from the cover structure. Thus, the cover structure is provided with advantageously located vents for upward flow of heated air and downward flow of cool air as well as advantageously located drainage openings for disposal of the waste ice water.

Referring to Figure 1, there is shown schematically a refrigerator car 10 provided with similar conventional ice bunkers 11 at either end containing stacked boxes 12 of produce above which a layer of crushed ice 13 is supported by a cover structure 14. While the boxes 12 are not shown as spaced apart in Figure 1 because of the small scale of the figure, such spacing is effected for flow of air between and around the boxes. The arrangement as shown in Figures 2 and 3 shows the boxes 12 stacked in the type of crosswise loading designated the "Hoak" load in which the spacing of the boxes is maintained by cross-shaped uprights 16 into which the corners of the boxes fit. Also, if desired, the boxes may be spaced vertically from each other by means of slats or spacing strips 17.

In accordance with the instant invention a cover structure is provided in the form of a plurality of corrugated or ribbed cover sheets or members 18, which, in the present instance, extend transversely of the refrigerator car. The corrugations of the cover members provide valleys for flow of drainage ice water in one direction only along the cover sheets, this direction being preferably endwise of the boxes, and drainage openings or apertures 19 are formed in the sheet 18 to allow the escape of drainage water downward between the ends of adjacent stacks of boxes, these ends being solid so that there is little possibility of the water dripping or being splashed onto the produce within the boxes. Adjacent their side edges the cover members or sheets 18 are provided with upturned lips or edges 21 which preferably extend higher than the tops of the corrugations to positively prevent sidewise sloshing of the water on the cover sheet past the edge of the sheet. As seen in Figures 2 and 3, the adjacent lips 21 are spaced apart to provide a vent opening 22 for ascent and descent of air between the sides of the boxes.

The cover sheets are securely locked together to form a cover structure and are also maintained in place by means of the upright posts 16, being notched at the edge to fit the post, as seen in Figure 2. The locking of adjacent cover sheets together is effected by means of the curved or bent side extensions 23 of the lips 21 at either side of the posts 16 to further lock the cover sheets with respect to the posts. The locking extensions 23 of one cover sheet have nested engagement with the similar extensions of an adjacent sheet and thereby interlock the adjacent cover sheets as seen more clearly in Figure 3.

The form of the invention shown in Figures 5 and 6 is generally similar to that shown and described in connection with Figures 2 to 4, inclusive, but illustrates the cover structure in connection with a lengthwise load or a crosswise load in which there are no box engaging uprights as shown at 16 in Figures 2 to 4. Otherwise, the construction is the same and similar reference numerals have been applied.

The form of the invention shown in Figures 7 and 8 illustrates a cover sheet 18a which is dimensioned to extend over two adjacent tiers or rows of stacked boxes and these sheets 18a are generally similar to those previously described except that they are provided with internal longitudinal openings 26 surrounded by an upwardly extended lip 27 similar to the lips 21 but also extending across the ends of the openings 26 to prevent drainage of water therethrough.

Figures 9 and 10 illustrate a cover structure of two layers of corrugated sheets in which the bottom layer includes cover sheets or members 18b generally similar to the cover sheets 18 and 18a previously described, these sheets being adapted to rest directly upon the stacks of boxes and being provided with the drainage openings 19 between the adjacent ends of the boxes, the vent openings 22 formed by the lips 21, and the interlocking extensions 23. The top layer or cover sheet 18c has its corrugations extending transversely to those of the bottom layer 18b and the adjacent sheets 18c are similarly connected together by interlocking extensions 23. The upper cover sheets 18c is provided with apertures 28 in its valleys to permit direct drainage of the melted ice onto the lower cover sheet 18b and has its openings 22 aligned with the drainage opening 19 of the lower cover member. This double cover structure is advantageous in preventing the accumulation of ice water at any one point on the load and serves to restrict any splashing or sloshing of water by effecting a more even and uniform distribution of the drainage water as a further protection against wetting of the produce.

In connection with the above embodiments of the invention it will be seen that in each case an advantageous drainage path is provided for ice water so that it is conducted to the floor of the refrigerator car without substantial contact with the boxed produce. At the same time provision is made for the flow of air to the various sides and ends of the boxes to enhance cooling of the produce. Preferably these cover sheets are formed of a paper material so as to be disposable and not require re-shipment from the destination back to the source of the produce. For this purpose they may be made of a paper product and are preferably formed of a paper product sold under the trade name of "DuraPak" by the Patterson Parchment Paper Company of Bristol, Pennsylvania. This paper is non-soluble in water and so has the characteristic of retaining its strength when wetted.

While I have shown certain preferred embodiments of the invention it will be seen that the invention is capable of variation and modification from the form shown so that its scope should be limited only by the scope of the claims appended hereto.

I claim:

1. A cover member for installation within a refrigerating space such as a refrigerator car on the load therein to support a layer of refrigerant such as crushed ice, comprising a sheet having a valley for flow of melted refrigerant in one direction therealong and having one or more apertures for discharge of melted refrigerant therethrough, upturned lips along the edges of said sheet extending substantially parallel to the valley, and an interlocking extension from at least one of said lips to engage an adjacent cover member.

2. A cover member for installation within a refrigerating space such as a refrigerator car on the load therein to support a layer of refrigerant such as crushed ice, comprising a sheet having a plurality of valleys for flow of melted refrigerant in one direction therealong and having spaced apertures for discharge of melted refrigerant therethrough, upturned lips along the edges of said sheet extending substantially parallel to the valleys, and an interlocking extension from at least one of said edges to engage an adjacent cover member.

3. A disposable cover member for installation within a refrigerator car on the load of boxed produce therein to support a layer of refrigerant such as crushed ice, comprising a sheet of paper material having corrugations extending in one direction therealong and upturned side lips parallel to the corrugations and extending upwardly above the corrugation, said sheet also having spaced transversely extending perforations therein along the corrugations to provide for discharge of melted ice therethrough with the spacing of the perforations corresponding to the lengthwise dimension of the boxes, said side lips and said perforations serving to control drainage flow of melted refrigerant.

4. A cover structure for supporting an ice layer above stacked boxes of fruits and vegetables within an enclosed refrigerating space such as a refrigerator car, comprising a plurality of adjacent corrugated sheets having perforations spaced to discharge melted ice and said sheets having means providing flanged openings therebetween, said sheets also having respective interlocking extensions.

5. A cover structure for supporting an ice layer above stacked boxes of fruits and vegetables within an enclosed refrigerating space such as a refrigerator car, comprising a plurality of adjacent sheets having valleys formed therein and having perforations spaced along the valleys to discharge melted ice, said sheets also having respective interlocking extensions.

6. A cover structure for supporting an ice layer above stacked boxes of fruits and vegetables within an enclosed refrigerating space such as a refrigerator car, comprising a plurality of cooperating parallel sheets having a combined cross-sectional area substantially equal to the cross-sectional area to be covered, interlocking extensions on adjacent pairs of said parallel sheets, said sheets having valleys formed therein and having perforations spaced along the valleys to discharge melted ice, and said sheets having upwardly extending lips at the side edges thereof to provide for additional circulation of air.

7. A cover structure for supporting an ice layer above stacked boxes of fruits and vegetables within an enclosed refrigerating space such as a refrigerator car, comprising a plurality of interlocking corrugated sheets forming a layer having a cross-sectional area substantially equal to the cross-sectional area to be covered, said sheets having perforations spaced to discharge melted ice at spaced intervals therealong, said sheets providing flanged openings therebetween, and a second plurality of interlocking corrugated sheets forming an upper layer with the corrugations extending transversely of the corrugations of the first or lower layer, said sheets of said upper layer having spaced perforations in the valleys thereof.

8. A cover structure for supporting an ice layer above stacked boxes of fruits and vegetables within an enclosed refrigerating space such as a refrigerator car, comprising a plurality of interlocking sheets forming a layer having a cross-sectional area substantially equal to the cross-sectional area to be covered, each of said sheets having a valley disposed lengthwise thereof, said sheets having perforations spaced to discharge melted ice, said sheets also providing flanged openings above the spaces therebetween, and a second plurality of interlocking sheets forming an upper layer with valleys extending transversely of the valleys of the first or lower layer, said sheets of said upper layer having spaced perforations in the valleys thereof.

HUBERT S. GOSS.

REFERENCES CITED

The following references are of record in the file of this patent:

UNITED STATES PATENTS

| Number | Name | Date |
|---|---|---|
| 1,958,832 | Mauthe | May 15, 1934 |
| 2,062,140 | Merrill | Nov. 24, 1936 |